Figure 1:
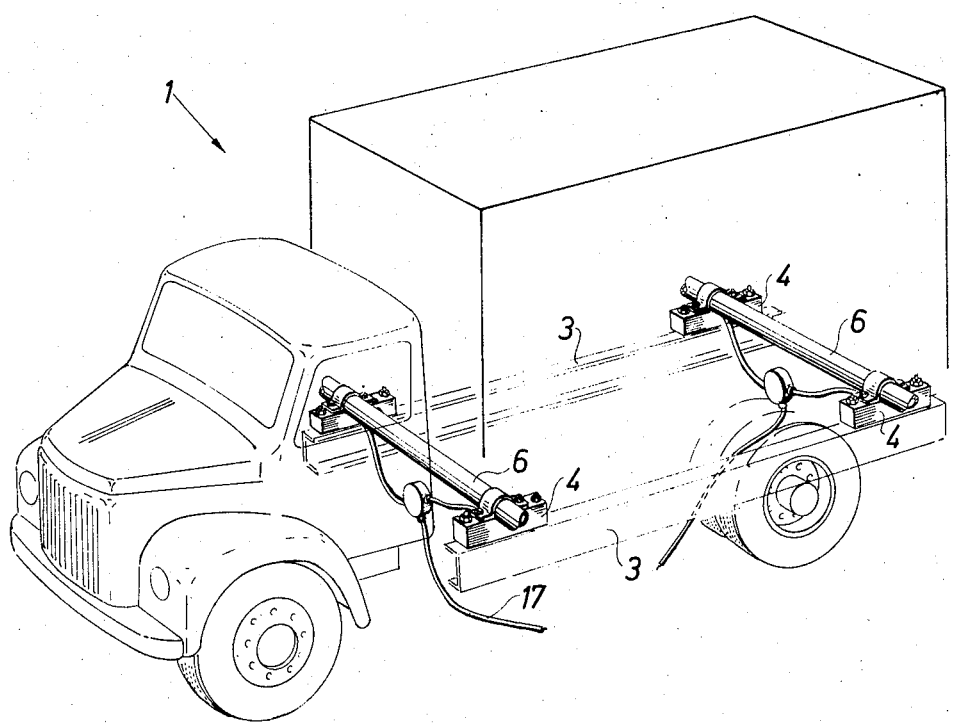

United States Patent [19]
Malmgren et al.

[11] 3,794,130
[45] Feb. 26, 1974

[54] DEVICE FOR WEIGHING OF VEHICLE LOADS

[75] Inventors: Per Ake Malmgren; Kurt Eilert Johansson, both of Kiruna, Sweden

[73] Assignee: Ake Malmgrens Mekaniska Verkstad AB, Kiruna, Sweden

[22] Filed: June 19, 1972

[21] Appl. No.: 263,826

[30] Foreign Application Priority Data
June 24, 1971  Sweden.............................. 8254/71
July 20, 1971  Sweden.............................. 9340/71

[52] U.S. Cl. ............................................. 177/137
[51] Int. Cl............................................. G01g 19/08
[58] Field of Search ........................... 177/136–141

[56] References Cited
UNITED STATES PATENTS
3,247,917   4/1966   Balke................................. 177/137

1,147,128   7/1915   Troll.............................. 177/137 X

FOREIGN PATENTS OR APPLICATIONS
1,211,808   3/1966   Germany........................... 177/136

*Primary Examiner*—George H. Miller, Jr.
*Attorney, Agent, or Firm*—Sughrue, Rothwell, Mion, Zinn & Macpeak

[57] ABSTRACT

Fastening device for load cell for fitting between the chassis of a truck and a part of the truck which is movable in relation to the chassis for measurement of forces acting on the platform, said device comprising a fastening element constituting a supporting device for said movable part of the truck and designed to be fitted to the truck with some play, at one end of the fastening element there being at this end a carrying member for the load cell fitted between bearing devices placed on the chassis and on said movable part.

4 Claims, 7 Drawing Figures

DEVICE FOR WEIGHING OF VEHICLE LOADS

The invention relates to a fastening device for a load cell for fitting between the chassis of a truck and a part of the vehicle which is movable in relation to the chassis to enable measurement of forces acting on the platform.

For the weighing of truck loads — among other purposes for checking that maximum permissible loads and axle loads are not exceeded — the entire vehicle can be driven up onto a stationary scale, after which the weight of the load is calculated by deducting the curb weight of the vehicle. But it is often desirable to be able to check the weight of the load and the axle load at any time, and for this purpose a number of devices have been proposed which are designed for stationary fitting to trucks.

A known principle, for instance, is, by means of mechanical or hydraulic lifting devices fitted between the wheel axles and platform of the truck, to relieve the load on the spings of the truck and thereafter, by means of suitable measuring devices fitted in the lifting devices, to read the load resting on the lifting devices. Devices are also known which are designed to be affixed between the vehicle chassis and its platform, thus constituting points of support for the platform. As such devices must be constructed so as to allow tilting of the platform, often not only backwards in relation to the vehicle but also sideways in two directions, they are complicated and therefore expensive. A disadvantage of known devices of this kind is that they should be fitted to the vehicle at the time of its manufacture or that they can only be fitted to existing vehicles of a given type. The fitting work is often complicated and the platform must be not inconsiderably raised, which is a serious disadvantage.

Other disadvantages of known devices for weighing of loads on vehicle platforms are associated with torsion in the vehicle chassis, which always occurs during driving and parking on uneven ground. Such torsion in the vehicle chassis gives rise to torsional forces, frictional forces etc. in the measuring devices, which render the results of the measurement extremely unreliable. The measuring devices may even be jammed in such a way as to be rendered entirely inoperative.

The object of the present invention is to eliminate these disadvantages and to accomplish a device which is cheap to manufacture and simple to fit to vehicles of different kinds. The invention consists of a fastening device for a load cell, the device being designed for fitting between a vehicle chassis and a part of the vehicle which is movable in relation to the chassis, to enable measurement of forces acting on the platform, the invention being characterized essentially in that the fastening device comprises a fastening element designed to constitute a support for said moving part of the vehicle and to be fitted to the vehicle with some clearance, at least at one end of the fastening element, there being at this end a load cell carrying member fastened between bearing devices arranged both on the vehicle chassis and on said moving part.

According to an advantageous further development of the invention the fastening device comprises a supporting plate designed for fastening to the vehicle and for carrying the fastening element. In such case a bearing device need not be arranged in the vehicle, but is arranged instead in the supporting plate. In this way the fastening device constitutes a unit which can be simply fitted without extensive alterations of the vehicle.

The fastening element can be fitted either between the platform and a frame side member or between an axle spring and a frame side member. The special form of the fastening element permits the load cell to be placed at the side of the actual point of support, so that the fastening element can be given robust dimensions required for heavy loads without need for the platform to be appreciably raised on that account in relation to the level it would assume without means for weighing of loads on the platform. Furthermore the fastening device permits relatively large movements in the vehicle chassis or in the platform without jeopardizing the accuracy of measurement. Fitting of the fastening device according to the invention can also be done without observation of unduly narrow tolerances.

According to one embodiment of the invention the fastening element has the form of a somewhat elongated parallelipiped, a recess for the carrying member being arranged close to one end of the fastening element. A fastening element of this kind is extremely cheap to manufacture. The recess for the carrying member may suitably consist of a cylindrical hole of diameter exceeding the maximum cross-section of the carrying member. In this way the longitudinal axis of the carrying member is allowed to swing slightly inside the hole. For reception of one of two balls constituting spherical bearing devices a bowl-shaped recess is required in the bottom of the cylindrical recess in the fastening element. It is especially advantageous,however, to drill through the fastening element from the bottom of the cylindrical recess and to thread the hole so formed to take a screw having at one end a bowl-shaped recess for the ball. This provides the means for regulating the distance between the fastening element and the chassis.

According to an advantageous further development of the invention the fastening element is devised for attachment to the vehicle by means of bolts, and between the fastening element and the chassis a ball is embedded both in the fastening element and in the chassis at the end remote from the carrying member. This ball thus serves as support and bearing point for the fastening element so that the latter can allow movements in the vehicle chassis and platform and between the chassis and platform without jeopardizing the load-weighing function. Alternatively the fastening element, at its end remote from the carrying member, can be rotatably journalled in the chassis around a shaft fixed to the chassis.

According to another embodiment of the invention the fastening element is rigidly secured to the chassis by means of a spacer device, the material selected for the fastening element being slightly resilient. The function of the fastening element will then be the same as if it were journalled around a shaft or by means of a ball in the manner stated above.

According to still another embodiment of the invention the fastening element is designed to constitute a support for the end of a leaf-spring and to be mounted between it and the vehicle.

The special form of the fastening element in such case permits the carrying member for the load cell to be placed either on the upper side or lower side of the actual point of support. The fastening element may suitably have the form of an acute-angled triangular disc with a slotted groove for the end of the leaf-spring cut in its edge along one longitudinal side. At its acute-angled end the fastening element is rotatably journalled round a shaft fixed to the chassis. The cut-out for the end of the leaf-spring provides some play so that the spring can be allowed free longitudinal motion. The fastening element bearing thus takes up the sliding forces of the spring without transmitting them to the load cell.

In one embodiment designed for vehicles on which the end of the leaf-spring is looped for journalling around a shaft, the fastening element consists of a link coupling between the end of the leaf-spring and one end of the carrying member. The other end of the carrying member is rotatably journalled around a shaft fixed to the chassis and constituting a point of support for the total load on the end of the spring.

The longitudinal sliding movement of the leaf-spring is taken up as a short oscillating motion in the linkage system of the fastening element and carrying member and does not disturb the function of the load cell.

The fastening element permits relative movements between chassis and spring mounting, at the same time as means are obtained for measuring with great accuracy the compressive forces represented by the load of the vehicle.

As load cell or sensitive element for measurement of forces acting on the vehicle the use of a conventional wire strain gauge placed on the carrying member is suggested according to the invention.

The fastening element attached with some play can thus take up very large compressive forces and does not weaken the construction of the vehicle. It also permits relative movements between chassis and platform, at the same time as means are obtained for measuring with great accuracy the compressive forces acting upon the platform.

Some embodiments of the invention will now be described with reference to the attached drawings, of which FIG. 1 shows a schematically a truck with fastening devices according to the invention, mounted between the platform and chassis of the truck, FIG. 2 a perspective view of an embodiment of a fastening element according to the invention, FIG. 3 a vertical section of an alternative embodiment of the fastening element, FIG. 4 a vertical section of another embodiment of the fastening element, FIG. 5 a perspective view of an embodiment of the invention for fitting between a vehicle chassis and spring mounting, FIG. 6 a perspective view of a modification of the device shown in FIG. 5, and FIG. 7 a perspective view of still another modification of the device shown in FIG. 5.

FIG. 1 shows schematically a truck 1 with tilting beams 6 carried on frame side members 3. According to one embodiment of the invention fastening elements 4 are placed between the tilting beams 6 and the frame side members 3. These fastening elements 4 are placed at four points, but they may also be placed at only three points.

Figure 2:
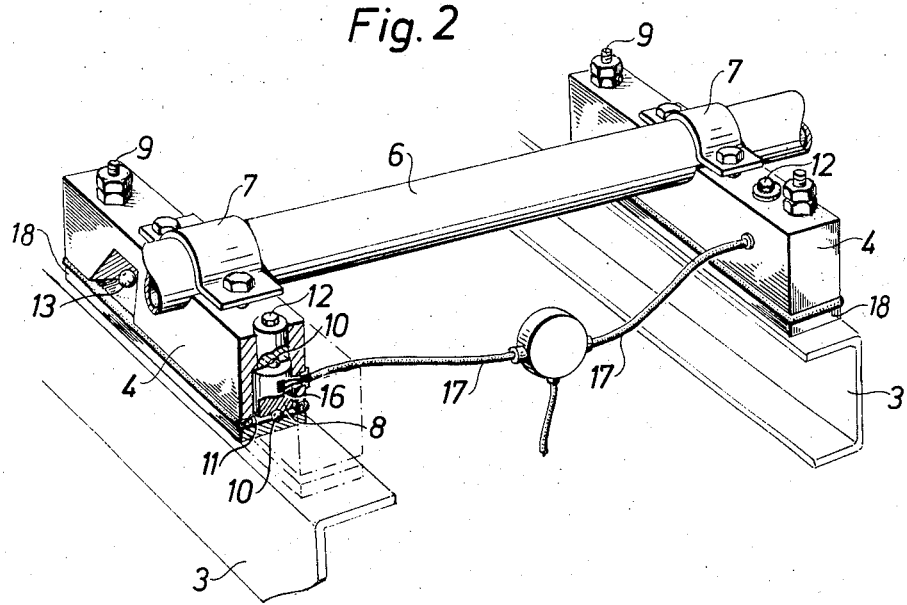

FIG. 2 shows in greater detail an embodiment of the fastening device according to the invention. This comprises a fastening element 4 which, by means of bolts 9, is attached with some play to a supporting plate 18 carried on a frame side member 3 of the vehicle. At one end of the fastening element 4 there is drilled a non-through hole 11. At the other end of the fastening element a ball 13 is situated between the fastening element 4 and the supporting plate 18. This ball rests in bowl-shaped recesses in the fastening element 4 and the supporting plate 18 and thus allows a certain rotation of the fastening element 4 owing to the play in its attachment to the frame side member 3. In the hole 11 between the fastening element 4 and the supporting plate 18 there is also a carrying member 8 designed to carry a load cell 16 for measurement of forces acting on the platform. This carrying member is secured between two balls 10 which, like the ball 13, are situated in ball-shaped recesses, both in the supporting plate and fastening element and at both ends of the bearing member 8. To permit adjustment of the distance between the fastening element 4 and the supporting plate 18 at this end of the fastening element, there is drilled through the fastening element 4 from the bottom of the hole 11 a hole, of smaller diameter than hole 11, to take an adjusting screw 12.

On the upper side of the fastening element 4 the tilting beam 6 of the platform rests in a semicylindrical recess in the fastening element and is held in place by a clamp 7. In this embodiment, accordingly, the platform is rotatably mounted around a fixed tilting beam, but the fastening element according to the invention can of course also be used for platforms where the tilting beam is rigidly attached to the platform and is itself pivoted in a bearing on the chassis. The bearing is in such case secured in the semicircular recess in the fastening element 4 and is rigidly held in position by the clamp 7.

Figure 3:
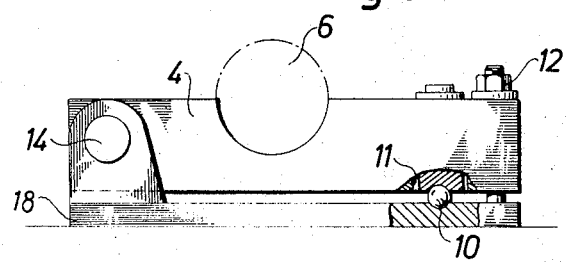

FIG. 3 shows another embodiment of the fastening element according to the invention, the carrying member however being the same as in the embodiment in FIG. 2, so that this member need not be described and is not shown in detail. The essential difference between these two embodiments is that, in the embodiment in FIG. 3, the fastening element 4, at its end remote from the carrying member, is pivoted around a shaft 14 which is fixed to the supporting plate 18. The function of the fastening element in other respects is exactly as described with reference to FIG. 2.

Figure 4:
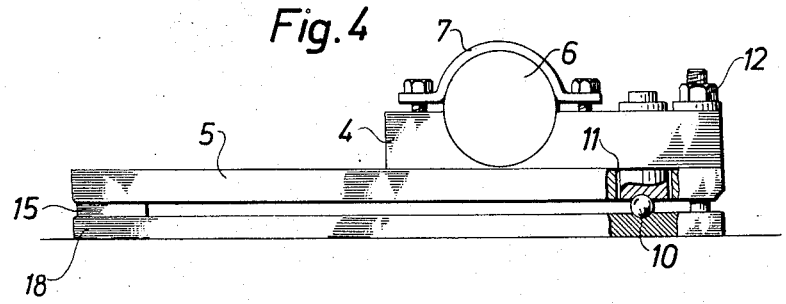

FIG. 4 shows still another embodiment of the invention, the fastening element 4 being welded to a plate 5 which at one end is rigidly secured to the supporting plate 18 by means of a spacing device 15. As the plate 5 can take up both resilient and torsional movement, the function of the fastening element is the same as that of the elements shown in FIGS. 2 and 3. It is, of course, also possible to construct the fastening element 4 and the plate 5 as a single part, the spring action thus taking place in the fastening element itself.

The devices according to the embodiments of the invention in FIGS. 2-4 are designed primarily for mounting between a truck platform and its chassis, but they can of course simply be modfied for fitting between chassis and a spring mounting. FIGS. 5-7, on the other hand, show devices according to the invention which are designed solely for fitting between chassis and a spring mounting.

Figure 5:
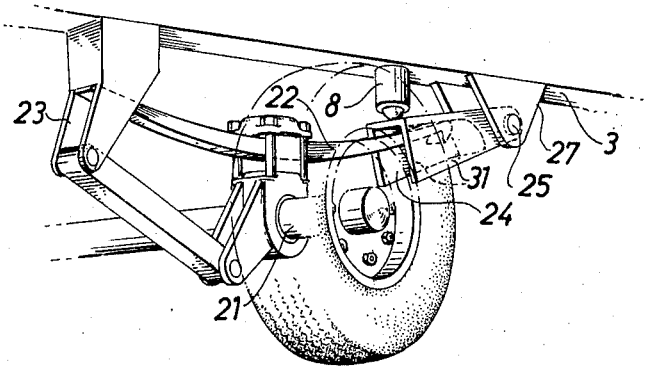

FIG. 5 thus shows a spring-suspended wheel undercarriage with an axle 21 secured in a set of leaf-springs 22 carrying a chassis frame side member 3 over a bracket 23, a fastening element 24, 25, 27 and a carrying member 8. The fastening device comprises a fastening element 24 journalled with some play via a shaft 25 in a bracket 27 which is rigidly secured to the frame side member 3.

At the end of the fastening element 24 remote from the bracket 27 there is drilled a through hole for a bearing of the shaft 25.

Perpendicular to the hole for the shaft 25 there is arranged along and in the edge of the fastening element 24 a groove constituting a seating and slideway for the longitudinal sliding movements of the spring 22.

Between the fastening element 24 and the frame side member 3 there is a pressure-sensing, conventional carrying member 8 for a load cell to permit measurement of the bearing forces of the spring suspension.

Figure 6:
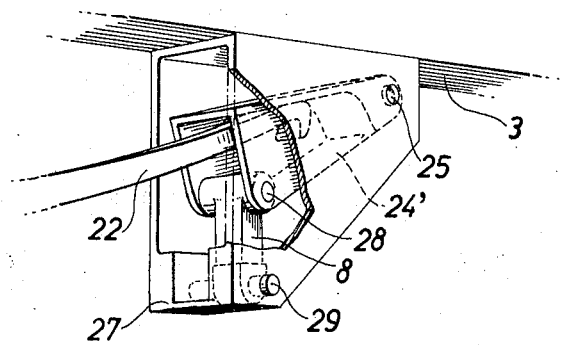

FIG. 6 shows the fastening element according to one embodiment in which the carrying member is placed on the underside of the spring mounting, the fastening element 24' having a hole for journalling of the carrying member 8 around a shaft 28, apart from which the fastening element 24' is similar to the fastening element 24 in FIG. 5.

Figure 7:
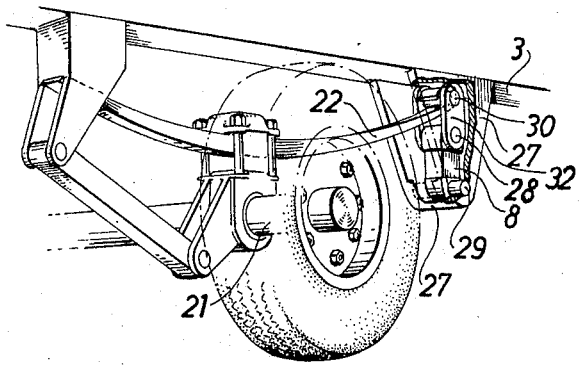

FIG. 7 shows still another embodiment of the invention for use in cases when the end of the leaf-spring is looped to carry a shaft 30.

The fastening element 32 consists of a link coupling between the end of the leaf-spring and the carrying member 8 and is spherically mounted around the shafts 28 and 30, while the other end of the carrying member is spherically mounted around the shaft 29, which is rigidly secured to the bracket 27 and constitutes a point of support for the total load on the end of the spring. The bracket 27 is rigidly secured to the frame side member 3.

As the measuring device for indication and, possibly, recording of forces acting on the platform does not constitute a part of the invention, it has not been shown in the drawings but is merely indicated in FIGS. 1 and 2. Thus, on the carrying member 8 there is a wire strain gauge 16 which, via electric cables 17, is connected to instrumental equipment in the truckdriver's cabin. The electric components for measurement and indication can be selected on principles known to the expert.

The device according to the invention thus implies that carrying members for sensitive elements can be mounted vertically without the height of the platform above the frame side members being noticeably affected, and as a result of the special form of the fastening element and the special way in which it is attached to the vehicle the transverse forces due to elastic deformations in the chassis or platform are eliminated. The fastening element, furthermore, can take up braking and acceleration forces and is so designed that no frictional forces affect the results of measurement. The fastening device is also extremely easy to fit to and remove from vehicles of varying types, and the carrying member with load cell fitted to it can easily be protected against dirt.

Although the invention has been described with reference to some of its embodiments, it can nevertheless be arbitrarily varied within the scope of the subsequent claims.

What we claim is:

1. An arrangement for mounting a weight sensing load cell on a truck between a load supporting member of the truck and ground support means of the truck, comprising:
    a. a downwardly depending bracket mounted on the truck frame adjacent one end of leaf spring means centrally secured to a wheel axle of the truck,
    b. a fastening element pivitally mounted at one end to the bracket and having an internal slideway for accomodating and supporting said one end of the leaf spring means at a point spaced from its pivotally mounted end, and
    c. a carrying member for a load cell pivotally mounted to and between the bracket and the fastening element.

2. An arrangement as defined in claim 1 wherein the pivotal mountings of the carrying member are both remote from the pivotal mounting of the fastening element to the bracket.

3. An arrangement for mounting a weight sensing load cell on a truck between a load supporting member of the truck and ground support means of the truck, comprising:
    a. a downwardly depending bracket mounted on the truck frame adjacent one end of leaf spring means centrally secured to a wheel axle of the truck,
    b. a fastening element pivotally mounted at one end to said one end of the leaf spring means, and
    c. a carrying member for a load cell pivotally mounted to and between the bracket and the other end of the fastening element.

4. An arrangement as defined in claim 3 wherein the fastening element is a link coupling between the leaf spring means and the carrying member.

* * * * *